US011267579B2

(12) United States Patent
Ross et al.

(10) Patent No.: US 11,267,579 B2
(45) Date of Patent: Mar. 8, 2022

(54) COMPOUND HELICOPTERS HAVING HYBRID PROPULSION ENGINES

(71) Applicant: Textron Innovations Inc., Providence, RI (US)

(72) Inventors: Brent Chadwick Ross, Flower Mound, TX (US); Steven Ray Ivans, Ponder, TX (US); Alan Carl Ewing, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 469 days.

(21) Appl. No.: 16/365,573

(22) Filed: Mar. 26, 2019

(65) Prior Publication Data

US 2020/0309066 A1 Oct. 1, 2020

(51) Int. Cl.
*F02K 3/075* (2006.01)
*B64D 33/04* (2006.01)
*B64C 27/26* (2006.01)
*F02C 3/10* (2006.01)
*F02K 3/062* (2006.01)
(Continued)

(52) U.S. Cl.
CPC .............. *B64D 33/04* (2013.01); *B64C 27/26* (2013.01); *F02C 3/10* (2013.01); *F02C 7/042* (2013.01); *F02K 1/002* (2013.01); *F02K 3/062* (2013.01); *F02K 3/075* (2013.01); *F05D 2220/329* (2013.01)

(58) Field of Classification Search
CPC . F02K 3/062; F02K 3/075; F02K 3/10; F02K 1/002; F02C 7/042
See application file for complete search history.

(56) References Cited

U.S. PATENT DOCUMENTS 3,119,577 A * 1/1964 Andrews ................. B64C 27/26
244/7 R
3,241,791 A 3/1966 Piasecki
(Continued)

OTHER PUBLICATIONS

Gaffin et al., "Turbofan/Turboshaft Powerplant for Composite Helicopters", Society of Automotive Engineers (SAE), National Aeronautic Meeting, New York, New York, Apr. 24-27, 1967, pp. 1-8. (Year: 1967).*

(Continued)

*Primary Examiner* — Lorne E Meade
(74) *Attorney, Agent, or Firm* — Lawrence Youst PLLC

(57) ABSTRACT

A hybrid propulsion engine for a rotorcraft includes a core turboshaft engine having a gas path and an output shaft that provides torque to a main rotor. A fan module is disposed relative to the core turboshaft engine and is coupled to the output shaft. The fan module has a bypass air path that is independent of the gas path. A thrust nozzle is configured to mix exhaust gases from the core turboshaft engine with bypass air from the fan module and to discharge the mixture to provide propulsive thrust. In a turboshaft configuration, the fan module is closed to prevent the flow of bypass air therethrough such that the thrust nozzle does not provide propulsive thrust. In a turboshaft and turbofan configuration, the fan module is open allowing the flow of bypass air therethrough such that the thrust nozzle provides propulsive thrust, thereby supplying propulsion compounding for the rotorcraft.

16 Claims, 8 Drawing Sheets

(51) Int. Cl.
*F02K 1/00* (2006.01)
*F02C 7/042* (2006.01)

(56) References Cited

U.S. PATENT DOCUMENTS

| | | | | |
|---|---|---|---|---|
| 3,351,304 A | * | 11/1967 | Stein | B64C 29/0025 244/17.19 |
| 3,423,048 A | * | 1/1969 | Clarke | F02C 7/36 244/7 R |
| 3,563,496 A | | 2/1971 | Zuck | |
| 3,807,662 A | * | 4/1974 | Velazquez | B64C 27/82 244/17.19 |
| 3,938,761 A | * | 2/1976 | Hempenstall | B64D 11/00 244/13 |
| 4,214,440 A | * | 7/1980 | Rucker | F02C 3/04 60/226.3 |
| 4,610,410 A | | 9/1986 | Sibley | |
| 4,711,415 A | * | 12/1987 | Binden | B64C 27/325 244/17.19 |
| 4,789,115 A | * | 12/1988 | Koutsoupidis | B64C 27/26 244/215 |
| 4,791,783 A | * | 12/1988 | Neitzel | F01D 17/162 60/226.3 |
| 4,928,907 A | | 5/1990 | Zuck | |
| 7,584,923 B2 | * | 9/2009 | Burrage | B64C 29/0033 244/17.23 |
| 7,731,121 B2 | | 6/2010 | Smith et al. | |
| 8,469,308 B2 | * | 6/2013 | Robertson | B64C 15/02 244/52 |
| 8,752,786 B2 | * | 6/2014 | Sonneborn | B64C 27/025 244/17.19 |
| 8,757,537 B2 | * | 6/2014 | Walliser | B64C 15/14 244/17.19 |
| 10,563,593 B2 | * | 2/2020 | McNeil | F02C 3/04 |
| 11,052,999 B2 | * | 7/2021 | Ross | F02C 3/10 |
| 2005/0151001 A1 | | 7/2005 | Loper | |
| 2006/0157614 A1 | | 7/2006 | Simpson | |
| 2017/0191427 A1 | * | 7/2017 | McNeil | F02K 3/075 |

OTHER PUBLICATIONS

McArdle et al., "Experimental Program for the Evaluation of Turbofan/Turboshaft Conversion Technology", NASA Technical Memorandum 82988, Lewis Research Center, Cleveland, OH, Nov. 4, 1982, pp. 1-25. (Year: 1982).*

Jane's Aero-Engines, Issue Seven, Edited by Bill Gunston, Jane's Information Group Inc., Alexandria, Virginia, 2000, pp. 1-26. (Year: 2000).*

"McDonnell XV-1" Wikipedia webpage [https://en.wikipedia.org/wiki/McDonnell_XV-1 accessed on Jan. 7, 2022] (Year: 2021).*

* cited by examiner

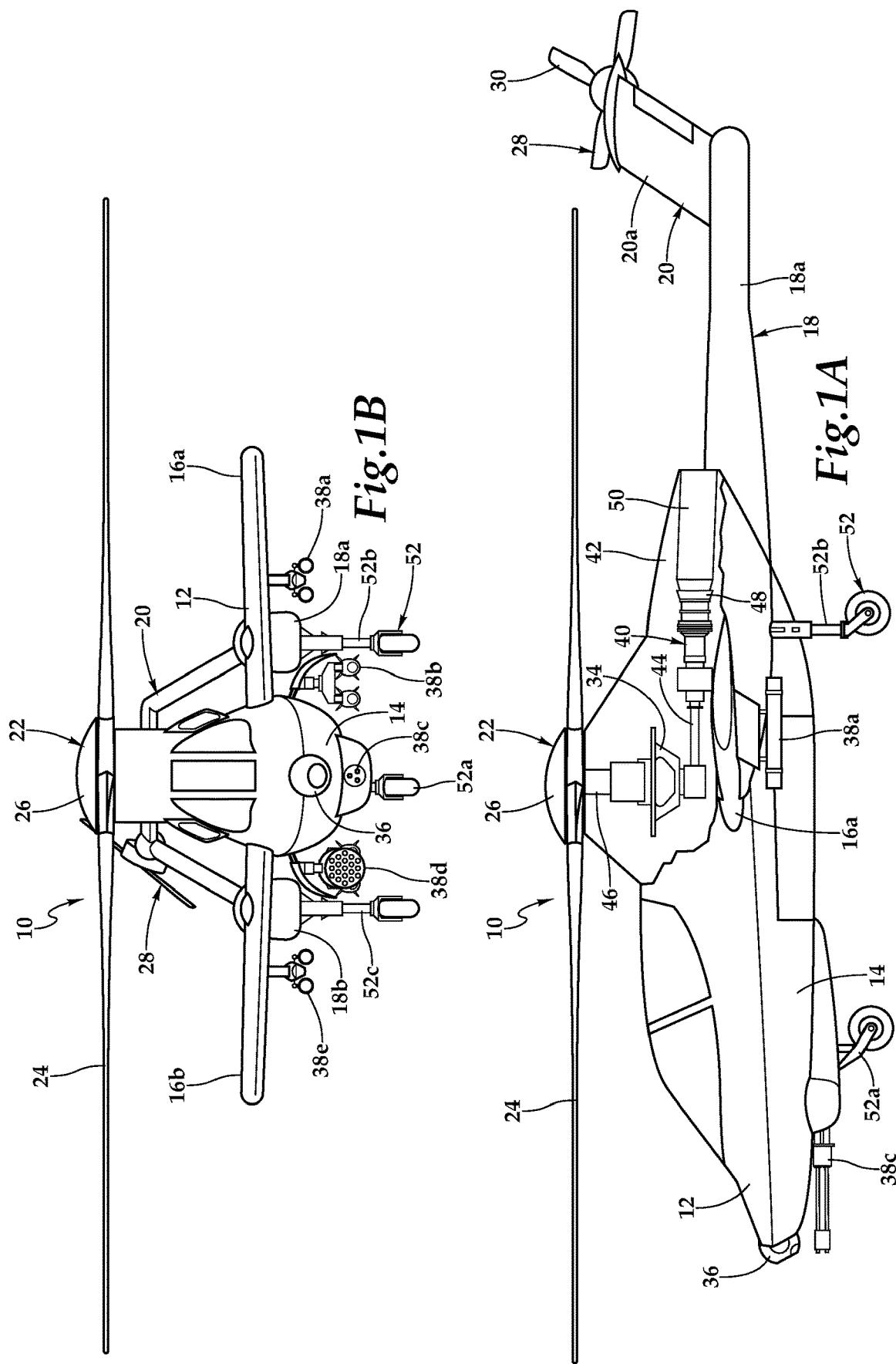

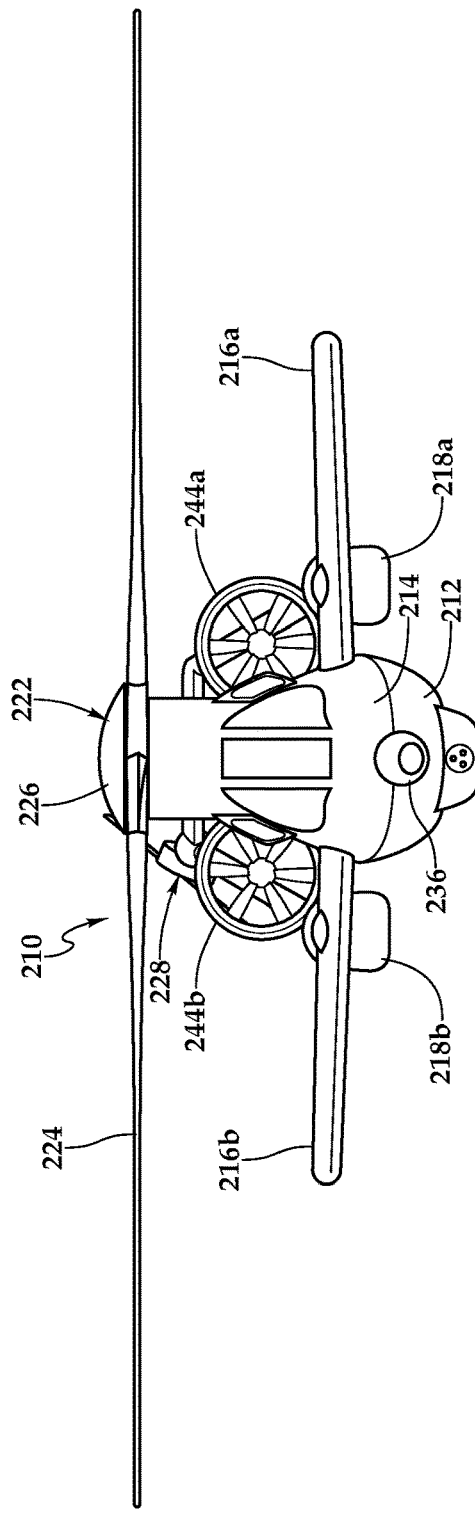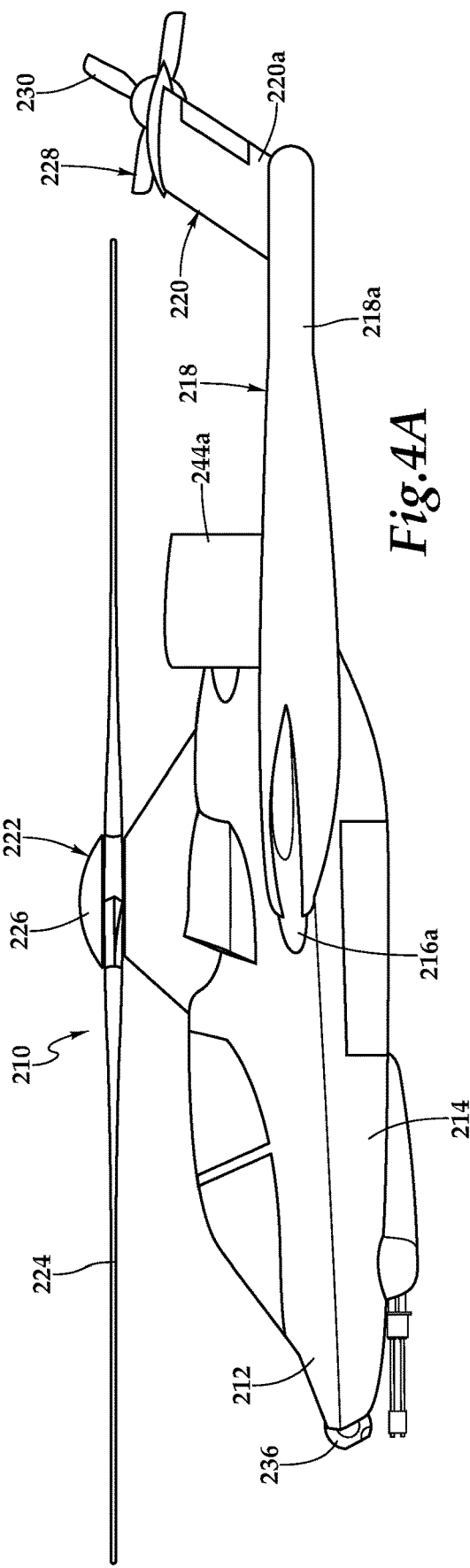

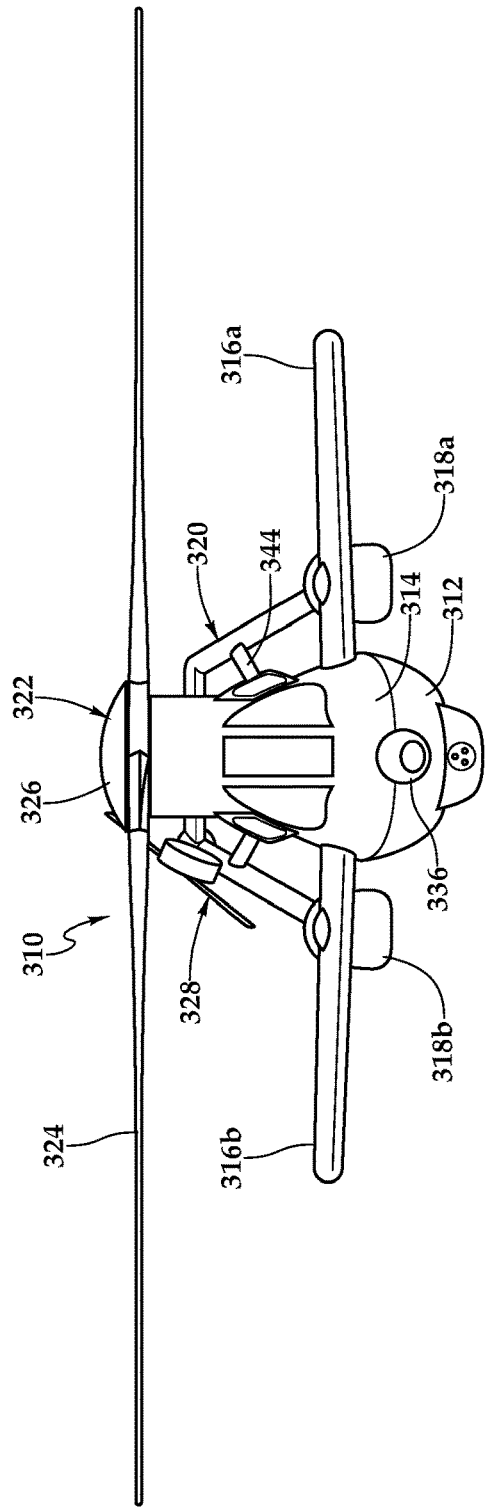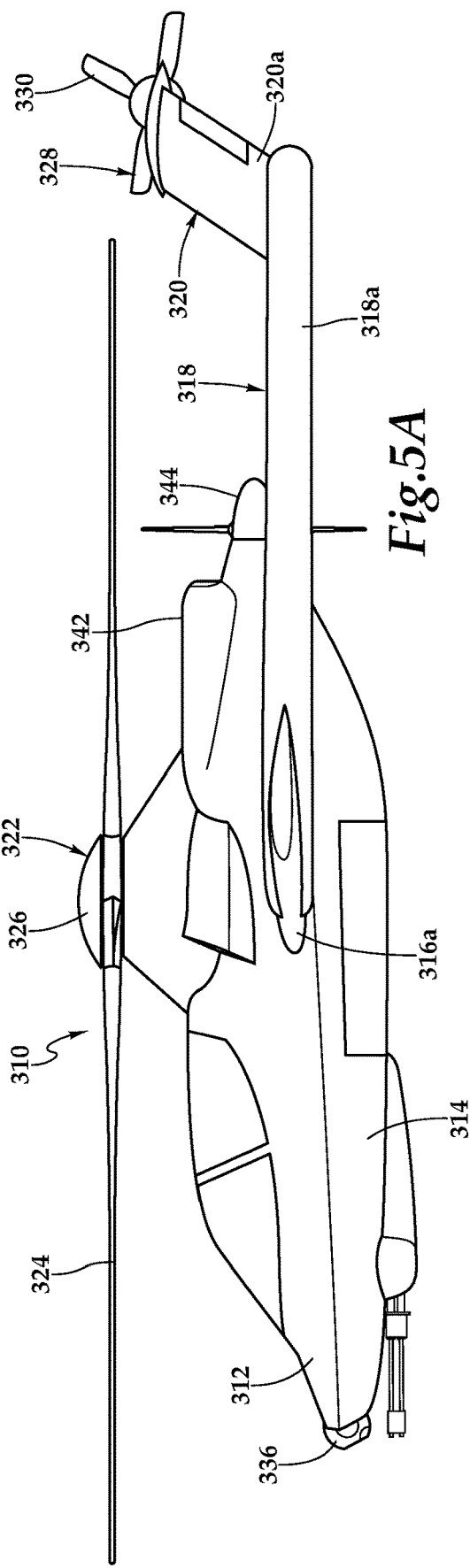

COMPOUND HELICOPTERS HAVING HYBRID PROPULSION ENGINES

TECHNICAL FIELD OF THE DISCLOSURE

The present disclosure relates, in general, to high speed helicopters having a single main rotor and, in particular, to compound helicopters having wings for lift compounding and an auxiliary propulsive system for propulsion compounding to offload lift and thrust requirements from the single main rotor to achieve high speed forward flight.

BACKGROUND

Conventional, single rotor helicopters have a limited top speed due to the problem of retreating blade stall, in which the rotor blade on the retreating side of the rotor disc in forward flight experiences a loss of lift due to the rotorcraft's linear forward flight velocity exceeding the rotor blade's minimum angular velocity for lift production. Attempts have been made to overcome retreating blade stall and increase the top speed of rotorcraft. For example, advancing blade concept rotorcraft utilize two counter rotating rotors that provide advancing blades on both sides of the rotorcraft during flight, allowing for increased forward airspeed. It has been found, however, that advancing blade concept rotorcraft are particularly susceptible to high amounts of vibration, contributing to crew fatigue, increased operating costs and structural instability.

As another example, various compound helicopter designs have been attempted that utilize lift compounding, propulsion compounding or both to overcome retreating blade stall. Lift compounding may be achieved by adding wings to the fuselage to partially offload the lift requirement from the main rotor during forward flight. Propulsion compounding may be achieved by adding an auxiliary propulsive system such as propellers or jets to partially or fully offload the thrust requirement from the main rotor during forward flight. Utilizing both wings for lift compounding and an auxiliary propulsive system for propulsion compounding may be referred to as fully compounding. It has been found, however, that performance, stability, control, safety and/or reliability remain elusive in conventional compound helicopter designs.

SUMMARY

In a first aspect, the present disclosure is directed to a hybrid propulsion engine for a rotorcraft having a main rotor. The hybrid propulsion engine includes a core turboshaft engine having a gas path including an inlet air stage, a compression stage, a combustion stage, a turbine stage and an exhaust stage. The core turboshaft engine includes an output shaft that provides torque to the main rotor. A fan module is disposed relative the core turboshaft engine and is coupled to the output shaft. The fan module has a bypass air path that is independent of the gas path. The bypass air path includes a bypass air inlet stage, a bypass air compression stage and a bypass air exhaust stage. The fan module has a closed configuration to prevent bypass air from flowing therethrough and an open configuration to allow bypass air to flow therethrough. A thrust nozzle is configured to mix the exhaust gases from the exhaust stage with the bypass air from the bypass air exhaust stage and to discharge the exhaust gases and bypass air mixture to provide propulsive thrust. In a turboshaft configuration of the hybrid propulsion engine, the fan module is in the closed configuration such that the thrust nozzle does not provide propulsive thrust. In a turboshaft and turbofan configuration of the hybrid propulsion engine, the fan module is in the open configuration such that the thrust nozzle provides propulsive thrust, thereby supplying propulsion compounding for the rotorcraft.

In some embodiments, the core turboshaft engine may include an air inlet section configured to draw in ambient air, a compressor section including a compressor configured to compress the ambient air from the air inlet section, a combustor section configured to mix the compressed air from the compressor section with fuel and ignite the compressed air and fuel mixture to form hot combustion gases, a turbine section including a turbine operated responsive to the flow of the hot combustion gases from the combustor section, the turbine driving the compressor and the output shaft and an exhaust section discharging exhaust gases from the turbine section. In certain embodiments, the compressor may be a multi-stage axial compressor having a pressure ratio between about 10 to 1 and about 20 to 1. In some embodiments, the turbine may include a compressor turbine that drives the compressor and a power turbine that drives the output shaft. In such embodiments, the compressor turbine may rotate independently of the power turbine. In certain embodiments, the compressor turbine may be a multi-stage compressor turbine and the power turbine may be a multi-stage power turbine.

In some embodiments, the fan module may include a bypass air inlet section, a bypass air compressor section and a bypass air exhaust section. In certain embodiments, the fan module may include a duct assembly and the bypass air path may be an annular bypass air path between the core turboshaft engine and the duct assembly. In some embodiments, the fan module may include a plurality of inlet doors actuatable between open and closed positions to allow and prevent bypass air to flow therethrough. In certain embodiments, the fan module may include a plurality of inlet guide vanes actuatable between open and closed positions to allow and prevent bypass air to flow therethrough. In some embodiments, the fan module may be positioned proximate an aft portion of the core turboshaft engine.

In certain embodiments, the thrust nozzle may be one of a fixed nozzle, a moveable nozzle, a thrust vectoring nozzle and an axisymmetric convergent/divergent nozzle. In some embodiments, in the turboshaft and turbofan configuration, the hybrid propulsion engine may have a bypass ratio of between about 1 to 1 and about 4 to 1. In certain embodiments, in the turboshaft and turbofan configuration, the hybrid propulsion engine may have a bypass ratio of between about 2 to 1 and about 3 to 1. In some embodiments, in the turboshaft and turbofan configuration, the hybrid propulsion engine may have a bypass ratio of about 2.5 to 1. In certain embodiments, in the turboshaft configuration, power from the core turboshaft engine may be directed to the main rotor. In some embodiments, in the turboshaft and turbofan configuration, power from the core turboshaft engine may be shared by the main rotor and the fan module.

In a second aspect, the present disclosure is directed to a compound rotorcraft. The compound rotorcraft includes a fuselage, at least one wing coupled to the fuselage and configured to provide lift compounding responsive to forward airspeed, a main rotor coupled to and rotatable relative to the fuselage and a hybrid propulsion engine deposed within the fuselage. The hybrid propulsion engine includes a core turboshaft engine having a gas path including an inlet air stage, a compression stage, a combustion stage, a turbine stage and an exhaust stage. The core turboshaft engine includes an output shaft that provides torque to the main rotor. A fan module is disposed relative the core turboshaft engine and is coupled to the output shaft. The fan module has a bypass air path that is independent of the gas path. The bypass air path includes a bypass air inlet stage, a bypass air compression stage and a bypass air exhaust stage. The fan module has a closed configuration to prevent bypass air from flowing therethrough and an open configuration to allow bypass air to flow therethrough. A thrust nozzle is configured to mix the exhaust gases from the exhaust stage with the bypass air from the bypass air exhaust stage and to discharge the exhaust gases and bypass air mixture to provide propulsive thrust. In a turboshaft configuration of the hybrid propulsion engine, the fan module is in the closed configuration such that the thrust nozzle does not provide propulsive thrust. In a turboshaft and turbofan configuration of the hybrid propulsion engine, the fan module is in the open configuration such that the thrust nozzle provides propulsive thrust, thereby supplying propulsion compounding for the rotorcraft.

In some embodiments, the main rotor may be a single main rotor. In certain embodiments, the fuselage may include a tail cone and the hybrid propulsion engine may be disposed within the tail cone. In such embodiments, the propulsive thrust from the thrust nozzle may be discharged from the tail cone.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of a compound rotorcraft having a hybrid turboshaft and turbofan engine for propulsion compounding in accordance with embodiments of the present disclosure;

FIGS. 4A-4C are schematic illustrations of a compound rotorcraft having ducted fans for propulsion compounding in accordance with embodiments of the present disclosure; and FIGS. 5A-5C are schematic illustrations of a compound rotorcraft having a pusher propeller for propulsion compounding in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1C:
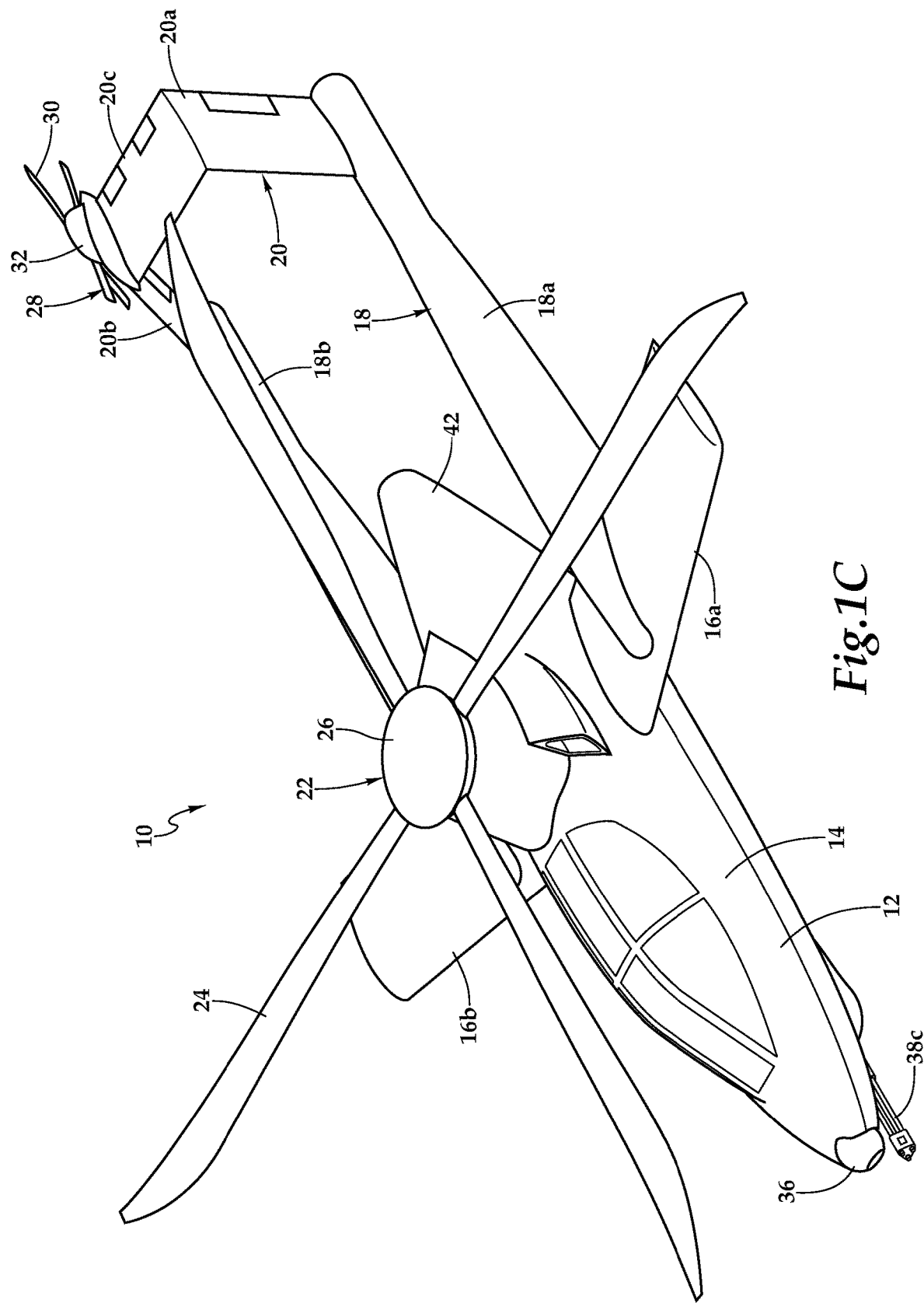

Referring to FIGS. 1A-1C in the drawings, a rotorcraft depicted as a compound helicopter is schematically illustrated and generally designated 10. Helicopter 10 includes an airframe 12 having a fuselage 14, wings 16a, 16b, a twin boom 18 and an empennage 20. In the illustrated embodiment, wings 16a, 16b extend laterally from fuselage 14 proximate the center of gravity of helicopter 10. Wings 16a, 16b provide a means for lift compounding responsive to the forward airspeed of helicopter 10 that offloads a portion of the lift requirements from a main rotor assembly 22. Wings 16a, 16b may be structurally separate wings or may form part of a unitary wing that traverses fuselage 14. Although wings 16a, 16b are shown as aft swept wings, it will be appreciated that wings 16a, 16b may be of a wide variety of shapes, sizes and configurations, depending upon the performance characteristics desired. Twin boom 18 includes a tail boom member 18a that extends aftward from a mid-wing location of wing 16a and a tail boom member 18b that extends aftward from a mid-wing location wing 16b. The aft ends of tail boom members 18a, 18b are coupled together by empennage 20, depicted as a high boom tail extending above twin boom 18 and including a pair of generally vertical stabilizers 20a, 20b and a horizontal stabilizer 20c. In some embodiments, vertical stabilizers 20a, 20b may include one or more movable control surfaces such as rudders for yaw control and/or horizontal stabilizer 20c may include one or more movable control surfaces such as elevators for pitch and/or roll control.

Helicopter 10 includes main rotor assembly 22 depicted as a single main rotor with four rotor blades 24 extending radially outward from a main rotor hub 26. Although main rotor assembly 22 has been depicted as having four rotor blades 24 with a particular design, it will be appreciated that main rotor assembly 22 may have other numbers of rotor blades both greater than or less than four and the rotor blades may be of a wide variety of shapes, sizes and configurations, depending upon the performance characteristics desired. Main rotor assembly 22 is coupled to fuselage 14 and is rotatable relative thereto. The pitch of rotor blades 24 can be collectively and/or cyclically manipulated to selectively control direction, thrust and lift of helicopter 10.

An anti-torque system 28 includes a tail rotor 30 that is rotatably coupled to empennage 20. Anti-torque system 28 controls the yaw of helicopter 10 by counteracting the torque exerted on fuselage 14 by main rotor assembly 22. While tail rotor 30 is illustrated as including four tail rotor blades, tail rotor 30 may have any number of tail rotor blades. The magnitude of anti-torque thrust generated by tail rotor 30 may be varied in a variety of ways. For example, the tail rotor blades may be variable pitch tail rotor blades whose pitch is changeable by a pitch change mechanism. In another example, the tail rotor blades may be fixed pitch tail rotor blades and tail rotor 30 may have a variable rotational speed. In the illustrated embodiment, anti-torque system 28 includes a variable speed electric motor 32 for rotating tail rotor 30. In other embodiments, anti-torque system 28 may include a hydraulic motor or tail rotor 30 may be mechanically driven by a tail rotor drive shaft coupled to a main rotor gearbox 34.

Fuselage 14 includes a nose assembly at the forward end of helicopter 10 that supports a turret assembly 36, which is rotatable relative to fuselage 14. Turret assembly 36 may include one or more devices or systems suitable for operation by helicopter 10. In the illustrated embodiment, turret assembly 36 supports one or more sensors including, for example, an infrared sensor, such as a forward-looking infrared (FLIR) sensor, a night vision sensor or other optical sensor, a laser sensor, a sound sensor, a motion sensor, a high resolution camera, a radar or any other type of sensor. Such sensors may have a wide variety of uses including in intelligence, surveillance, target acquisition and reconnaissance (ISTAR) and may form an integrated sensor suite. Helicopter 10 may optionally include one or more weapons modules 38a-38e that may be mounted to the underside of wings 16a, 16b and/or fuselage 14 or may be mounted within bay doors of fuselage 14. Weapons modules 38a-38e may be configured to launch a variety of missiles, torpedoes, bullets or similar munitions including, but not limited to, air-to-air missiles such as AIM-9 Sidewinder missiles, air-to-ground missiles such as Hellfire or JAGM missiles and/or anti-submarine ordnances such as MK50 torpedoes.

Helicopter 10 is powered by a hybrid turboshaft and turbofan engine 40 located in a tail cone 42 of fuselage 14. Engine 40 provides torque and rotational energy to main rotor assembly 22 via a drive shaft 44, main rotor gearbox 34 and a main rotor shaft 46. In addition, engine 40 provides an auxiliary propulsive system to helicopter 10 for propulsion compounding in the form of a pneumatic thruster system utilizing a fan module 48 and a thrust nozzle 50 disposed at the aft end of tail cone 42. Thrust nozzle 50 may be a fixed nozzle, a moveable nozzle, a thrust vectoring nozzle, an axisymmetric convergent/divergent nozzle or the like and may include heat and/or infrared radiation signature suppression features. In the illustrated embodiment, due to the design of twin boom 18 and empennage 20 of helicopter 10 as well as the non parallel arrangement of thrust nozzle 50 relative to twin boom 18, the exhaust from thrust nozzle 50 is discharged between and above tail boom members 18a, 18b, remote from vertical stabilizers 20a, 20b, horizontal stabilizer 20c and tail rotor 30 as well as below horizontal stabilizer 20c and tail rotor 30 with a slight downward angle relative to tail boom members 18a, 18b. With this configuration, the exhaust from thrust nozzle 50 does not impinge on the control surfaces of empennage 20. In other embodiments, thrust nozzle 50 may be parallel to twin boom 18.

Figure 2A:
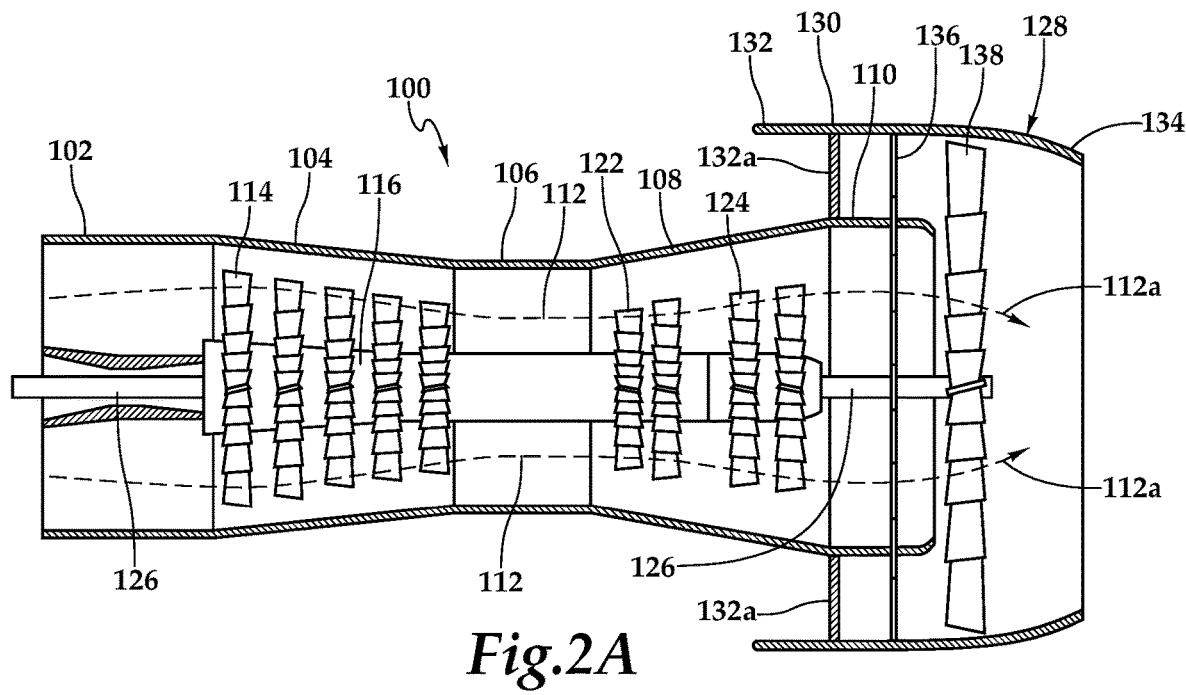
FIGS. 2A-2B are schematic illustrations of a hybrid turboshaft and turbofan engine configured to provide propulsion compounding for a compound rotorcraft in accordance with embodiments of the present disclosure.
Figure 2B:
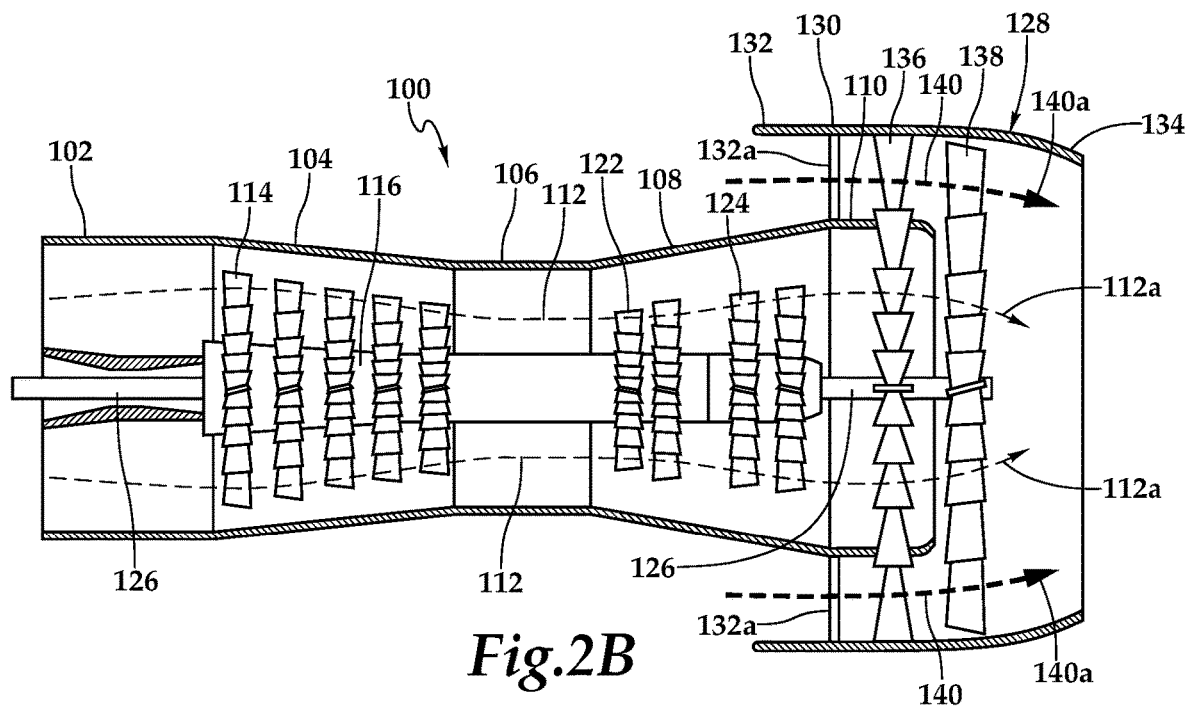

Referring additionally to FIGS. 2A-2B, a hybrid turboshaft and turbofan engine 100 is disclosed in further detail. Engine 100 including an air inlet section 102, a compressor section 104, a combustor section 106, a turbine section 108 and an exhaust section depicted as exhaust nozzle 110, which collectively form a core turboshaft engine and define a gas path, depicted as dashed lines 112, through engine 100. Gas path 112 includes an inlet air stage that corresponds with air inlet section 102, a compression stage that corresponds with compressor section 104, a combustion stage that corresponds with combustor section 106, a turbine stage that corresponds with turbine section 108 and an exhaust stage that corresponds with exhaust section 110. In operation, ambient air is drawn into air inlet section 102 then enters compressor section 104 wherein the air is compressed. In the illustrated embodiment, compressor section 104 includes a five-stage axial compressor 114 having a series of rotating blades that are mounted on a compressor shaft 116. Preferably, compressor 114 includes a series of stationary blades (not pictured) after each set of rotating blades. The rotating blades accelerate the air while the stationary blades decelerate and redirect the airflow, thereby compressing the air. In certain implementations, compressor section 104 may achieve between about a 10 to 1 and about a 20 to 1 overall pressure ratio or other suitable pressure ratio.

The compressed air is then mixed with fuel and ignited in combustor section 106. The fuel may be a liquid hydrocarbon fuel, such as diesel fuel, that is injected into combustor section 106 from a fuel injection system including a plurality of nozzles or other suitable injectors. The hot combustion gases expand and pass at high speed through turbine section 108 causing rotation of the turbine blades therein. In the illustrated embodiment, turbine section 108 includes a two-stage compressor turbine 122 and a two-stage power turbine 124. The blades of compressor turbine 122 are mounted on compressor shaft 116 such that rotation of compressor turbine 122 drives compressor 114. The blades of power turbine 124 are mounted on a power turbine output shaft 126 that is used to power the drive system and main rotor assembly 22 of helicopter 10 as well as a fan module 128. Preferably, compressor turbine 122 and power turbine 124 rotate independently of each other and are able to rotate at different speeds. Thus, a portion of the power generated by turbine section 108 is used to drive compressor 114 while the remaining power is available for propulsion of helicopter 10.

In the illustrated embodiment, fan module 128 is positioned at the aft end of engine 100. In other embodiments, fan module 128 could be positioned at the forward end of engine 100 or other suitable location. Fan module 128 includes a duct assembly 130 that has a bypass air inlet section 132 and a bypass air exhaust section depicted as exhaust nozzle 134 with a bypass air compressor section disposed therebetween. Inlet section 132 includes a plurality of actuatable inlet doors 132a that may be closed, as best seen in FIG. 2A, to substantially prevent air from entering fan module 128 or open, as best seen in FIG. 2B, to allow air to enter fan module 128. Inlet doors 132a may be slidable and/or rotatable with the positioning of inlet doors 132a being controlled by a computer and one or more electric or hydraulic actuators, with software located either in the helicopter flight control computer or the engine control computer. Inlet section 132 also includes inlet guide vanes 136. The bypass air compressor section includes a rotor disk 138 and may optionally include one or more stators.

In the illustrated embodiment, rotor disk 138 is driven by power turbine output shaft 126 that also supplies power to main rotor gearbox 34 for main rotor assembly 22. As such, no secondary drive system for fan module 128 is required eliminating the need for independent shafting for an isolated fan, thereby reducing part count, complexity and weight. In other embodiments, a gearbox may be positioned between power turbine output shaft 126 and rotor disk 138 such that the rotating speed of both the core turboshaft engine and fan module 128 can be optimized. Inlet guide vanes 136 and the optional stator do not rotate; however, the blades of inlet guide vanes 136 are variable pitch blades such that inlet guide vanes 136 may be closed, as best seen in FIG. 2A, to substantially prevent air from entering rotor disk 138 or open, as best seen in FIG. 2B, to allow air to enter rotor disk 138. The positioning of inlet guide vanes 136 is controlled by a computer and an electric or hydraulic actuation ring, with software located either in the helicopter flight control computer or the engine control computer. The blades of rotor disk 138 may be variable pitch or fixed pitch blades. It will be appreciated that inlet guide vanes 136, rotor disk 138 and the optional stator may be combined a wide variety of configurations of rotating or non-rotating disks and variable or fixed pitch blades, depending upon the performance characteristics desired.

As best seen in FIG. 2A, engine 100 has a turboshaft configuration wherein airflow through fan module 128 is minimized or prevented by operating inlet doors 132a and/or inlet guide vanes 136 to the closed position. In this configuration, the power generated by power turbine 124 is directed to main rotor assembly 22 via power turbine output shaft 126. As little or no airflow is occurring through fan module 128, only minimal drag is created on power turbine 124 responsive to rotation of rotor disk 138 by power turbine output shaft 126. The turboshaft configuration of engine 100 is preferably used during takeoffs, landings, hover, low speed flight regimes and other helicopter operations wherein main rotor assembly 22 requires maximum power. Once, helicopter 10 is engaged in forward flight, the power requirement of main rotor assembly 22 is reduced compared to takeoff and hover operations. In addition, as discussed herein, as the forward airspeed of helicopter 10 increases, wings 16a, 16b offload a portion of the lift requirements from main rotor assembly 22 which further reduces the power requirement of main rotor assembly 22. Engine 100 thus has spare power capacity during forward flight operations.

This power can be extracted by opening inlet doors 132a and inlet guide vanes 136 to allow bypass air to flow through fan module 128 alone a bypass air path depicted as heavy dashed lines 140 in FIG. 2B. Bypass air path 140 includes a bypass air inlet stage that corresponds with bypass air inlet section 132, a bypass air compression stage that corresponds with the bypass air compressor section and a bypass air exhaust stage that corresponds with bypass air exhaust section 134. In the illustrated embodiment, bypass air path 140 is an annular bypass air path between the core turboshaft engine and duct assembly 130. In this hybrid turboshaft and turbofan configuration, engine 100 now generates aft facing propulsive thrust by directing and mixing compressed bypass airflow 140a with the discharge gas stream 112a from the core turboshaft engine. This mixed, compressed airflow results from the unique configuration of fan module 128 with engine 100. In one implementation, in the hybrid turboshaft and turbofan configuration, engine 100 has a ratio of the mass of bypass airflow 140 to the mass of gas stream flow 112 between about 1 to 1 and about 4 to 1. In other implementations, this bypass ratio is between about 2 to 1 and about 3 to 1. In yet further implementations, this bypass ratio is about 2.5 to 1. It will be appreciated that in the hybrid turboshaft and turbofan configuration, engine 100 could have other bypass ratios both less than 1 to 1 and greater than 4 to 1 including bypass ratios between about 4 to 1 and about 10 to 1 or higher.

The operation of engine 100 in the hybrid turboshaft and turbofan configuration will now disclosed in further detail. As discussed herein, air enters the core turboshaft engine at air inlet section 102 and exits through exhaust section 110. At the same time, air enters fan air inlet 132 and is compressed within and directed through duct assembly 130 by rotor disk 138. The compressed air 140a from fan module 128 exiting through bypass air exhaust section 134 and the engine exhaust 112a exiting through exhaust section 110 are mixed together within thrust nozzle 50 (see FIG. 1A). In one implementation, engine exhaust section 110 may be a daisy-type nozzle that provides shear layers for disrupting the flow of exhaust 112a from the core turboshaft engine and facilitating the mixing of compressed air flow 140a with exhaust flow 112a. The mixed flow then exits through thrust nozzle 50 to provide the desired propulsion compounding for helicopter 10.

It should be noted that exhaust 112a from the core turboshaft engine is not considered propulsive; rather, the propulsive force is generated by the additional mass flow created by fan module 128. In addition, the mixing of the fan flow 140a with the engine exhaust flow 112a results in a highly diluted vehicle exhaust flow, thereby providing significant reductions in the infrared signature of helicopter 10. This may eliminate or reduce the cost, weight and complexity of conventional engine exhaust infrared suppressor devices. Importantly, hybrid turboshaft and turbofan engine 100 allows helicopter 10 to achieve high forward airspeed while maintaining a small footprint. In one non-limiting example, compound helicopter 10 may have a footprint size of equal to or less than 40 feet wide by 40 feet long while achieving forward airspeeds of 180 knots or higher, as compared to conventional helicopters that are larger and capable of forward airspeeds of only 125 to 150 knots.

From takeoff and hover through the low speed cruise regime, helicopter 10 operates engine 100 in the turboshaft configuration with power directed substantially to main rotor assembly 22 with little or no airflow through fan module 128 and little power expended on driving rotor disk 138. Yaw control is provided by tail rotor 30. As helicopter 10 increases forward velocity, wings 16a, 16b provide lift compounding by unload a portion of the lift requirement from main rotor system 22, such as 20 to 30 percent. In addition, as the power requirement for engine 100 is reduced in forward flight, available engine power can be extracted by operating engine 100 in the hybrid turboshaft and turbofan configuration providing propulsion compounding, wherein the mixed flow of compressed air 140a from fan module 128 and engine exhaust 112a exits thrust nozzle 50 and provides additional force to accelerate helicopter 10 to the high speed cruise regime. Once helicopter 10 achieves a specific design speed, such as 100 knots, vertical stabilizers 20a, 20b and the controllable rudders eliminate the need for yaw control by tail rotor 30. In this fully compounding configuration of helicopter 10, main rotor assembly 22 operates with a significant reduction in blade loading and flapping which not only improves ride quality but also reduces the acoustic signature of helicopter 10.

Figure 3A:
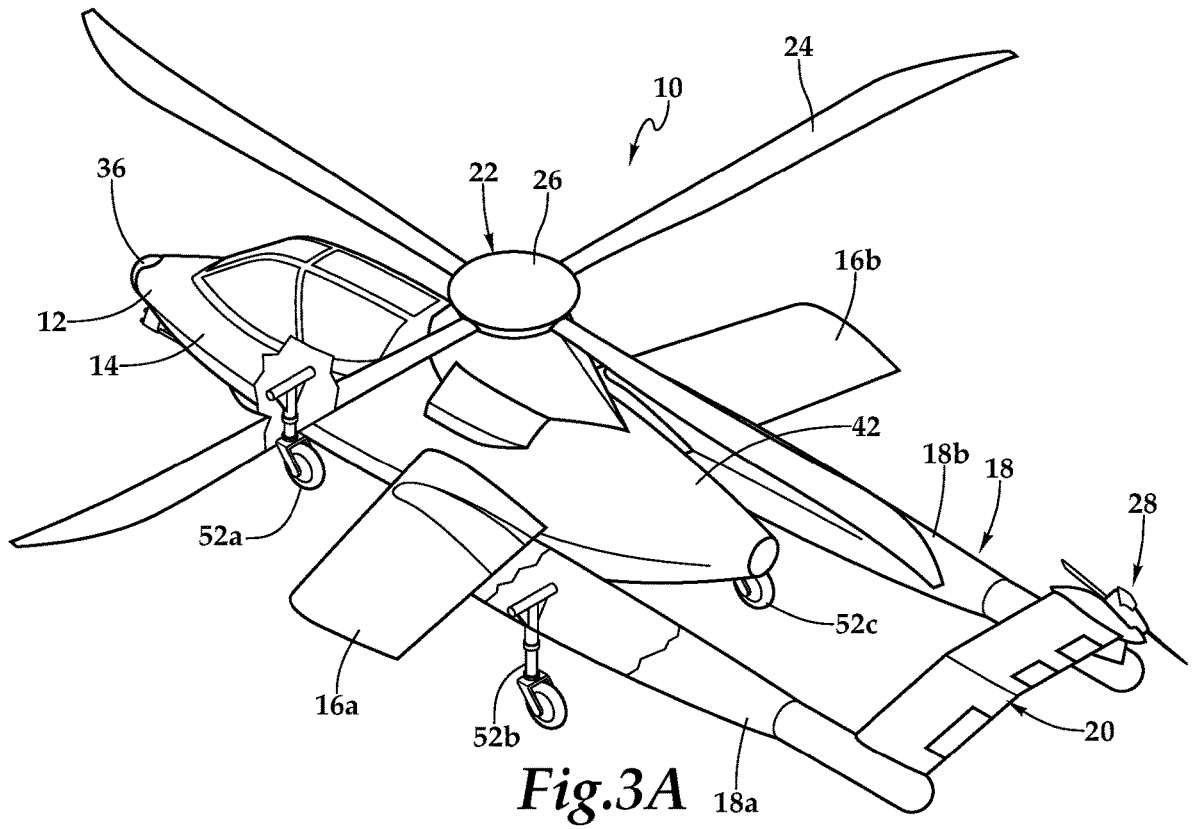
FIGS. 3A-3B are schematic illustrations of a compound rotorcraft having tricycle landing gear that are retractable into a twin boom in accordance with embodiments of the present disclosure.
Figure 3B:
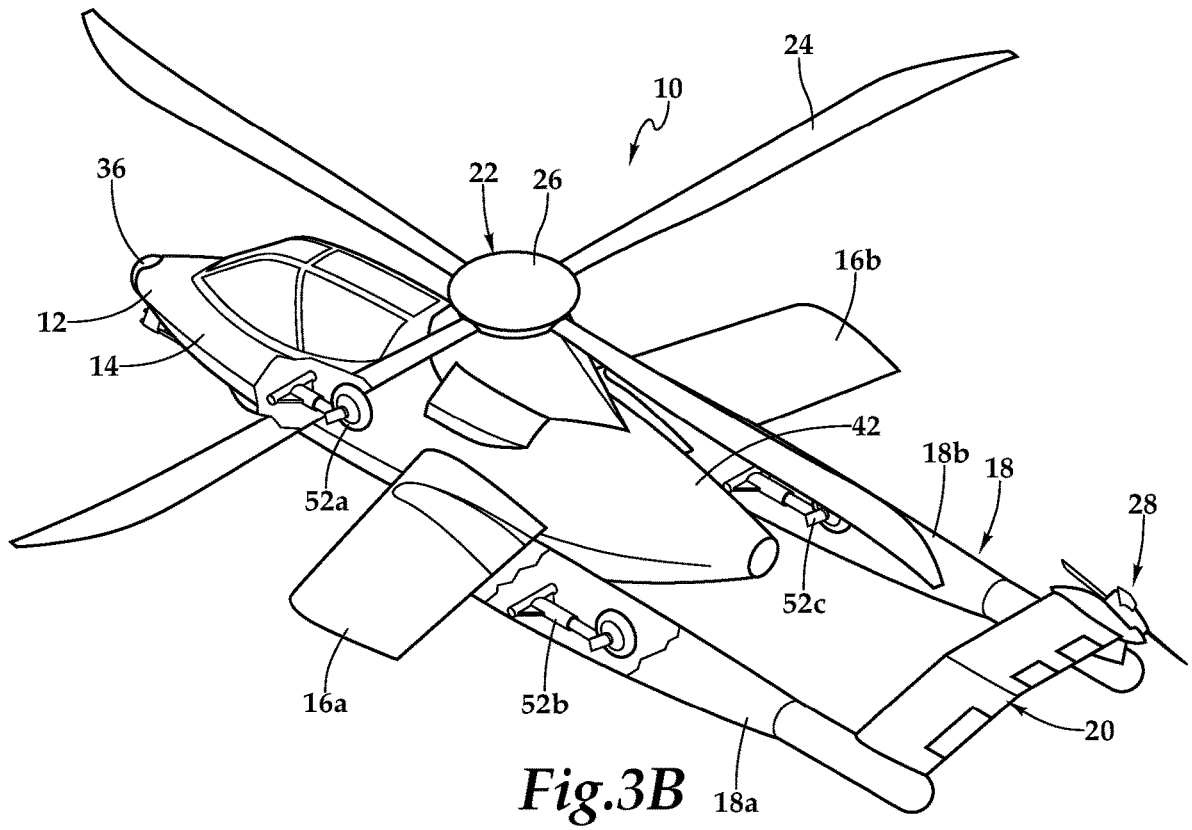

Referring additionally to FIG. 3A-3B of the drawings, operation of a retractable landing gear system of helicopter 10 will now be described. As best seen in FIG. 1B, helicopter 10 has a tricycle landing gear system 52 that provides ground support for helicopter 10. Tricycle landing gear system 52 including a single forward landing strut 52a and a pair of aft landing struts 52b, 52c. In the illustrated embodiment, forward landing strut 52a is offset from the centerline of helicopter 10 to accommodate the forward gun turret of helicopter 10. In other embodiments, forward landing strut 52a maybe positioned on the centerline of helicopter 10. Forward landing strut 52a is retractable within a lower bay of fuselage 14 and covered by a door to provide an aerodynamic profile to helicopter 10 to enhance high speed flight. As best seen in FIG. 3A, aft landing strut 52b is supported by and extendable from tail boom member 18a. Similarly, aft landing strut 52c is supported by and extendable from tail boom member 18b. As best seen in FIG. 3B, aft landing strut 52b is retractable into a lower bay of tail boom member 18a and is covered by a door to provide an aerodynamic profile to helicopter 10 to enhance high speed flight. Likewise, aft landing strut 52c is retractable into a lower bay of tail boom member 18b and is covered by a door to provide an aerodynamic profile to helicopter 10 to enhance high speed flight. Using tail boom members 18a, 18b to support aft landing struts 52b, 52c provides a wide stance for aft landing struts 52b, 52c that enhances the stability of helicopter 10 during ground operations.

Figure 4C:
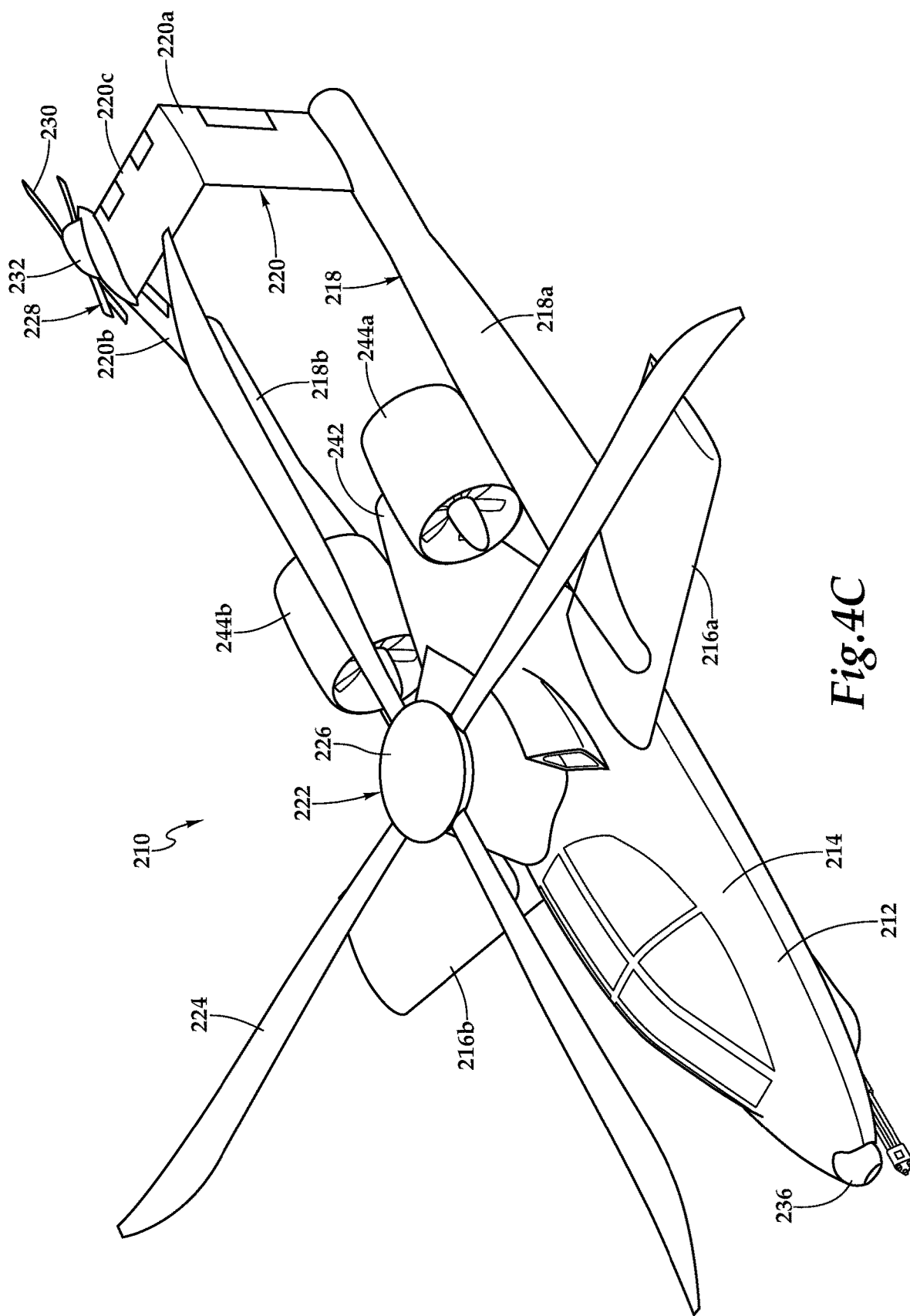

Referring to FIGS. 4A-4C in the drawings, a rotorcraft depicted as a compound helicopter is schematically illustrated and generally designated 210. Helicopter 210 includes an airframe 212 having a fuselage 214, wings 216a, 216b, a twin boom 218 and an empennage 220. In the illustrated embodiment, wings 216a, 216b extend laterally from fuselage 214 and provide a means for lift compounding responsive to the forward airspeed of helicopter 210. Twin boom 218 includes a tail boom member 218a that extends aftward from a mid-wing location of wing 216a and a tail boom member 218b that extends aftward from a mid-wing location wing 216b. The aft ends of tail boom members 218a, 218b are coupled together by empennage 220, depicted as a high boom tail extending above twin boom 218 and including a pair of generally vertical stabilizers 220a, 220b and a horizontal stabilizer 220c.

Helicopter 210 includes main rotor assembly 222 depicted as a single main rotor with four rotor blades 224 extending radially outward from a main rotor hub 226. Main rotor assembly 222 is coupled to fuselage 214 and is rotatable relative thereto. The pitch of rotor blades 224 can be collectively and/or cyclically manipulated to selectively control direction, thrust and lift of helicopter 210. An anti-torque system 228 includes a tail rotor 230 that is rotatably coupled to empennage 220. In the illustrated embodiment, anti-torque system 228 includes a variable speed electric motor 232 for rotating tail rotor 230. Fuselage 214 includes a nose assembly at the forward end of helicopter 210 that supports a turret assembly 236, which is rotatable relative to fuselage 214. Turret assembly 236 may include one or more devices or systems suitable for operation by helicopter 210 such one or more sensors. Helicopter 210 may optionally include one or more weapons modules that may be mounted to the underside of wings and/or fuselage or may be mounted within bay doors of fuselage 214. Helicopter 210 includes a retractable tricycle landing gear system (not visible) including a single forward landing strut retractable into fuselage 214 and a pair of aft landing struts respectively retractable into tail boom members 218a, 218b.

Helicopter 210 is powered by a turboshaft engine located in a tail cone 242 of fuselage 214. The engine provides torque and rotational energy to main rotor assembly 222 via a drive shaft, a main rotor gearbox and a main rotor shaft. Helicopter 210 includes an auxiliary propulsion system that provides propulsion compounding for helicopter 210 in the form of ducted fans 244a, 244b that are coupled to fuselage 214 and/or tail boom members 218a, 218b, respectively. Ducted fans 244a, 244b may having variable pitch or fixed pitch blades and may be variable speed fans. In the illustrated embodiment, ducted fans 244a, 244b are driven by inline mounted electric motors that are powered by batteries and/or an electric generator driven by the engine of helicopter 210.

From takeoff through the low speed cruise regime of helicopter 210, engine power is directed substantially to main rotor assembly 222. As helicopter 210 increases forward velocity, wings 216a, 216b provide lift compounding by unload a portion of the lift requirement from main rotor system 222. In addition, as the power requirement on the engine is reduced in forward flight, available engine power can be extracted by engaging an electric generator that provides electrical power to ducted fans 244a, 244b to provide additional force to accelerate helicopter 210 to the high speed cruise regime. Importantly, the use of ducted fans 244a, 244b allows helicopter 210 to achieve high forward airspeed while maintaining a small footprint.

Figure 5C:
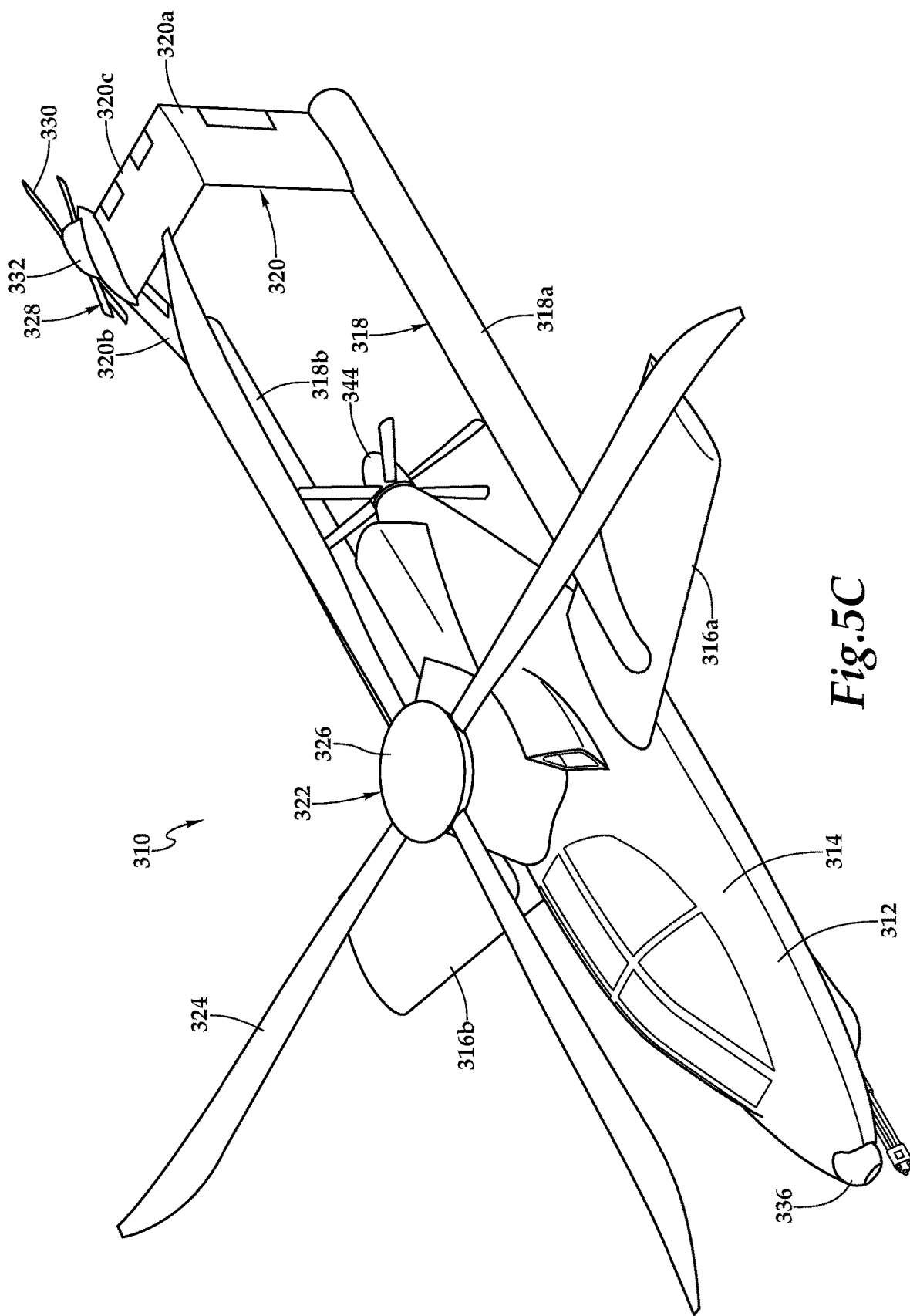

Referring to FIGS. 5A-5C in the drawings, a rotorcraft depicted as a compound helicopter is schematically illustrated and generally designated 310. Helicopter 310 includes an airframe 312 having a fuselage 314, wings 316a, 316b, a twin boom 318 and an empennage 320. In the illustrated embodiment, wings 316a, 316b extend laterally from fuselage 314 and provide a means for lift compounding responsive to the forward airspeed of helicopter 310. Twin boom 318 includes a tail boom member 318a that extends aftward from a mid-wing location of wing 316a and a tail boom member 318b that extends aftward from a mid-wing location wing 316b. The aft ends of tail boom members 318a, 318b are coupled together by empennage 320, depicted as a high boom tail extending above twin boom 318 and including a pair of generally vertical stabilizers 320a, 320b and a horizontal stabilizer 320c.

Helicopter 310 includes main rotor assembly 322 depicted as a single main rotor with four rotor blades 324 extending radially outward from a main rotor hub 326. Main rotor assembly 322 is coupled to fuselage 314 and is rotatable relative thereto. The pitch of rotor blades 324 can be collectively and/or cyclically manipulated to selectively control direction, thrust and lift of helicopter 310. An anti-torque system 328 includes a tail rotor 330 that is rotatably coupled to empennage 320. In the illustrated embodiment, anti-torque system 328 includes a variable speed electric motor 332 for rotating tail rotor 330. Fuselage 314 includes a nose assembly at the forward end of helicopter 310 that supports a turret assembly 336, which is rotatable relative to fuselage 314. Turret assembly 336 may include one or more devices or systems suitable for operation by helicopter 310 such one or more sensors. Helicopter 310 may optionally include one or more weapons modules that may be mounted to the underside of wings and/or fuselage or may be mounted within bay doors of fuselage 314. Helicopter 310 includes a retractable tricycle landing gear system (not visible) including a single forward landing strut retractable into fuselage 314 and a pair of aft landing struts respectively retractable into tail boom members 318a, 318b.

Helicopter 310 is powered by a turboshaft engine located in a tail cone 342 of fuselage 314. The engine provides torque and rotational energy to main rotor assembly 322 via a drive shaft, a main rotor gearbox and a main rotor shaft. In addition, the engine may selectively deliver power to an auxiliary propulsion system that provides propulsion compounding for helicopter 310 in the form of a pusher propeller 344 disposed at the aft end of tail cone 342. Pusher propeller 344 may be a fixed pitch or variable pitch pusher propeller and may operate at fixed or variable speed. In the illustrated embodiment, pusher propeller 344 is located between boom members 318a, 318b and remote from vertical stabilizers 320a, 320b, horizontal stabilizer 320c and tail rotor 30. Preferably, pusher propeller 344 is coupled to the engine by a suitable gearbox to provide gear reduction such that the engine and pusher propeller 344 may operate at optimum speeds. In addition, a suitable clutch mechanism is preferably positioned between the engine and pusher propeller 344 such that pusher propeller 344 may be disengaged from the engine during operations that require high power demand by main rotor assembly 322 such as during takeoffs, landings, hover and low speed flight regimes and engaged with the engine during forward flight operations when high speed is desired. In other embodiments, pusher propeller 344 may be powered by a variable speed electric motor or a hydraulic motor.

From takeoff through the low speed cruise regime of helicopter 310, engine power is directed substantially to main rotor assembly 322. As helicopter 310 increases forward velocity, wings 316a, 316b provide lift compounding by unload a portion of the lift requirement from main rotor system 322. In addition, as the power requirement on the engine is reduced in forward flight, available engine power can be extracted by engaging pusher propeller 344 to provide additional force to accelerate helicopter 310 to the high speed cruise regime. The use of the tail cone mounted pusher propeller 344 allows helicopter 310 to achieve high forward airspeed while maintaining a small footprint. In addition, it should be noted that positioning pusher propeller 344 between boom members 318a, 318b provided enhanced safety as boom members 318a, 318b act as barriers against making contact with the rotating propeller.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A compound rotorcraft comprising:
   a fuselage having a tail cone;
   first and second wings coupled to the fuselage and configured to provide lift compounding responsive to forward airspeed;
   a first tail boom coupled to the first wing and having a first aft end;
   a second tail boom coupled to the second wing and having a second aft end, the first aft end and the second aft end coupled together by an empennage, the tail cone located between the first tail boom and the second tail boom;
   a tail rotor rotatably coupled to the empennage;
   a main rotor coupled to and rotatable relative to the fuselage; and
   a hybrid propulsion engine deposed within the fuselage and including:
      a core turboshaft engine having a gas path including an inlet air stage, a compression stage, a combustion stage, a turbine stage and an exhaust stage, the core turboshaft engine including an output shaft that provides torque to the main rotor;
      a fan module disposed relative the core turboshaft engine and coupled to the output shaft, the fan module having a bypass air path that is independent of the gas path, the bypass air path including a bypass air inlet stage, a bypass air compression stage and a bypass air exhaust stage, the fan module having a closed configuration to prevent bypass air from flowing therethrough and an open configuration to allow bypass air to flow therethrough; and
      a thrust nozzle disposed within the tail cone in a non-parallel arrangement relative to the first tail boom and the second tail boom, the thrust nozzle configured to mix the exhaust gases from the exhaust stage with the bypass air from the bypass air exhaust stage and to discharge the exhaust gases and bypass air mixture from the tail cone with a downward angle relative the first tail boom and the second tail boom to provide propulsive thrust;
      wherein, in a turboshaft configuration of the hybrid propulsion engine, the fan module is in the closed configuration such that the thrust nozzle does not provide propulsive thrust; and
      wherein, in a turboshaft and turbofan configuration of the hybrid propulsion engine, the fan module is in the open configuration such that the thrust nozzle provides propulsive thrust, thereby supplying propulsion compounding for the rotorcraft.

2. The compound rotorcraft as recited in claim 1 wherein the main rotor further comprises a single main rotor.

3. The compound rotorcraft as recited in claim 1 wherein the inlet air stage is configured to draw in ambient air;
   wherein the compression stage includes a compressor configured to compress the ambient air from the inlet air stage;
   wherein the combustion stage is configured to mix the compressed air from the compression stage with fuel and ignite the compressed air and fuel mixture to form hot combustion gases;
   wherein the turbine stage includes a turbine operated responsive to the flow of hot combustion gases from the combustion stage, the turbine driving the compressor and the output shaft; and
   wherein the exhaust stage discharges exhaust gases from the turbine stage.

4. The compound rotorcraft as recited in claim 3 wherein the compressor further comprises a multi-stage axial compressor having a pressure ratio of between about 10 to 1 and about 20 to 1.

5. The compound rotorcraft as recited in claim 3 wherein the turbine further comprises a compressor turbine that drives the compressor and a power turbine that drives the output shaft and wherein the compressor turbine rotates independently of the power turbine.

6. The compound rotorcraft as recited in claim 5 wherein the compressor turbine further comprises a multi-stage compressor turbine and the power turbine further comprises a multi-stage power turbine.

7. The compound rotorcraft as recited in claim 1 wherein the fan module further comprises a duct assembly and wherein the bypass air path further comprises an annular bypass air path between the core turboshaft engine and the duct assembly.

8. The compound rotorcraft as recited in claim 1 wherein the fan module further comprises a plurality of inlet doors actuatable between open and closed positions to allow and prevent bypass air flow therethrough.

9. The compound rotorcraft as recited in claim 1 wherein the fan module further comprises a plurality of inlet guide vanes actuatable between open and closed positions to allow and prevent bypass air flow therethrough.

10. The compound rotorcraft as recited in claim 1 wherein the fan module is positioned proximate an aft portion of the core turboshaft engine.

11. The compound rotorcraft as recited in claim 1 wherein the thrust nozzle is selected from the group consisting of a fixed nozzle, a moveable nozzle, a thrust vectoring nozzle and an axisymmetric convergent/divergent nozzle.

12. The compound rotorcraft as recited in claim 1 wherein, in the turboshaft and turbofan configuration, the hybrid propulsion engine further comprises a bypass ratio of between about 1 to 1 and about 4 to 1.

13. The compound rotorcraft as recited in claim 1 wherein, in the turboshaft and turbofan configuration, the hybrid propulsion engine further comprises a bypass ratio of between about 2 to 1 and about 3 to 1.

14. The compound rotorcraft as recited in claim 1 wherein, in the turboshaft and turbofan configuration, the hybrid propulsion engine further comprises a bypass ratio of about 2.5 to 1.

15. The compound rotorcraft as recited in claim 1 wherein, in the turboshaft configuration, power from the core turboshaft engine is directed to the main rotor.

16. The compound rotorcraft as recited in claim 1 wherein, in the turboshaft and turbofan configuration, power from the core turboshaft engine is shared by the main rotor and the fan module.

* * * * *